United States Patent
Wan et al.

(10) Patent No.: US 10,824,669 B2
(45) Date of Patent: *Nov. 3, 2020

(54) STICKER RECOMMENDATION METHOD AND APPARATUS, SERVER CLUSTER, AND STORAGE MEDIUM

(71) Applicant: Tencent Technology (Shenzhen) Company Limited, Shenzhen (CN)

(72) Inventors: Wei Wan, Guangdong (CN); Lin Li, Guangdong (CN); Long Po Liu, Guangdong (CN); Qian Chen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,386

(22) Filed: Jun. 5, 2019

(65) Prior Publication Data

US 2019/0286648 A1 Sep. 19, 2019

Related U.S. Application Data

(63) Continuation of application No. PCT/CN2018/074561, filed on Jan. 30, 2018.

(30) Foreign Application Priority Data

Feb. 13, 2017 (CN) .......................... 2017 1 0075877

(51) Int. Cl.
*G06F 16/535* (2019.01)
*G06F 16/583* (2019.01)
(Continued)

(52) U.S. Cl.
CPC ............ *G06F 16/535* (2019.01); *G06F 16/00* (2019.01); *G06F 16/583* (2019.01); *G06N 20/00* (2019.01); *H04L 51/10* (2013.01)

(58) Field of Classification Search
CPC ...... G06F 3/0233; G06F 3/0237; G06F 16/00; G06F 16/535; G06F 16/583;
(Continued)

(56) References Cited

U.S. PATENT DOCUMENTS

2009/0163183 A1* 6/2009 O'Donoghue ......... G06Q 30/02
455/414.1
2011/0302126 A1* 12/2011 Sekino .............. G06F 16/24578
706/52

(Continued)

FOREIGN PATENT DOCUMENTS

| CN | 102611785 A | 7/2012 |
| CN | 102663092 A | 9/2012 |

(Continued)

OTHER PUBLICATIONS

Vriendt et al., "Video Content Recommendation: An Overview and Discussion on Technologies and Business Models", Bell Labs Technical Journal 16(2), 235-250 (2011). (Year: 2011).*

(Continued)

*Primary Examiner* — Reza Nabi
*Assistant Examiner* — Hwei-Min Lu
(74) *Attorney, Agent, or Firm* — Brinks Gilson & Lione (57) ABSTRACT

A sticker recommendation method and apparatus, a server cluster, and a storage medium are disclosed. The sticker recommendation method includes obtaining a use record of each group of stickers used by a user, each group of stickers corresponding to at least one image style obtaining an uncorrected recommendation index of a specified sticker, and obtaining an image style of the specified sticker, cor- (Continued)

recting the uncorrected recommendation index according to the use record, the image style of each group of stickers, and the image style of the specified sticker, and recommending the specified sticker to the user when the corrected recommendation index satisfies a recommendation condition. Accordingly, the sticker recommended to the user is a sticker obtained by comprehensively considering a preference of the user for the image style of the sticker, thereby improving a sticker recommendation effect.

17 Claims, 4 Drawing Sheets

(51) Int. Cl.
  G06N 20/00 (2019.01)
  H04L 12/58 (2006.01)
  G06F 16/00 (2019.01)
(58) Field of Classification Search
  CPC .... G06F 40/274; G06K 9/6217; G06K 9/626; G06N 3/02; G06N 3/08; G06N 20/00; H04L 51/04; H04L 51/046; H04L 51/10
  USPC .......................... 715/773; 702/723, 724, 725
  See application file for complete search history.

(56) References Cited

U.S. PATENT DOCUMENTS

| | | | | |
|---|---|---|---|---|
| 2013/0066819 | A1* | 3/2013 | Nice | G06Q 30/0255 706/14 |
| 2013/0124449 | A1* | 5/2013 | Pinckney | G06N 5/045 706/52 |
| 2014/0016822 | A1 | 1/2014 | Sakamoto | |
| 2014/0096037 | A1* | 4/2014 | Grosz | H04N 1/00196 715/753 |
| 2014/0310304 | A1 | 10/2014 | Bhardwaj et al. | |
| 2015/0220774 | A1* | 8/2015 | Ebersman | G06F 3/0482 382/118 |
| 2016/0034970 | A1 | 2/2016 | Musil et al. | |
| 2016/0048902 | A1* | 2/2016 | Ward | G06Q 30/0631 705/26.7 |
| 2016/0212484 | A1* | 7/2016 | Kimble | H04N 21/2668 |
| 2016/0371274 | A1* | 12/2016 | Ng | G06F 16/24578 |
| 2017/0017649 | A1* | 1/2017 | Srinivasaraghavan | G06F 16/435 |
| 2017/0287044 | A1* | 10/2017 | Rose | H04L 67/306 |
| 2018/0357258 | A1* | 12/2018 | Bu | G06N 3/04 |

FOREIGN PATENT DOCUMENTS

| | | |
|---|---|---|
| CN | 103440335 A | 12/2013 |
| CN | 103793498 A | 5/2014 |
| CN | 104394057 A | 3/2015 |
| CN | 104834677 A | 8/2015 |
| CN | 105975563 A | 9/2016 |
| CN | 106355429 A | 1/2017 |
| CN | 108287857 A | 7/2018 |

OTHER PUBLICATIONS

Office Action dated Mar. 3, 2020 for Chinese Application No. 201710075877.0 with concise English Translation, 6 pages.
International Search Report and Written Opinion dated Apr. 27, 2018 for PCT Application No. PCT/CN2018/074561, 14 pages.
Office Action dated Aug. 4, 2020 for Chinese Application No. 201710075877.0 with concise English Translation, 10 pages.

* cited by examiner

STICKER RECOMMENDATION METHOD AND APPARATUS, SERVER CLUSTER, AND STORAGE MEDIUM

CROSS-REFERENCE TO RELATED APPLICATION(S)

This application is a continuation of International Patent Application No. PCT/CN2018/074561, filed Jan. 30, 2018, which claims priority to Chinese Patent Application No. 201710075877.0, entitled "STICKER RECOMMENDATION METHOD AND APPARATUS" filed with the China National Intellectual Property Administration on Feb. 13, 2017, all of which are incorporated by reference in their entirety herein.

FIELD OF THE TECHNOLOGY

This application relates to the field of network application technologies, and in particular, to a sticker recommendation method and apparatus, a server cluster, and a storage medium.

BACKGROUND OF THE DISCLOSURE

Sticker post is one of common functions used by a user during use of a social network application. In the social network application, in addition to built-in stickers, the social network application may further provide the user with stickers developed by a third-party developer. The stickers are selected by the user for download and use.

As the stickers developed by the third-party developer increase, it is difficult for the user to quickly select a favored sticker from massive stickers. Therefore, in the related technology, the social network application usually recommends, to the user, stickers that are relatively popular currently; or recommends stickers relatively frequently used by another user having the same feature or the same hobby as that of the user, and the user selects a favored sticker from the stickers.

In the related technology, the sticker recommended by the social network application to the user is a sticker relatively frequently used by most users or another user having the same feature or the same hobby as that of the user. The stickers may not include a sticker favored by the current user, causing a relatively poor sticker recommendation effect.

SUMMARY

Embodiments of this application provide a sticker recommendation method and apparatus, a server cluster, and a storage medium, to resolve a problem of a relatively poor sticker recommendation effect in the related technology due to that stickers recommended by a social network application to a user may not include a sticker favored by the current user or a sticker favored by a current user is not recommend. The technical solutions are as described herein.

According to one aspect of the embodiments of this application, a sticker recommendation method is provided. The method is applied to a server cluster and includes obtaining a use record of each group of stickers used by a user, each group of stickers corresponding to at least one image style, and each group of stickers including at least one picture; obtaining an uncorrected recommendation index of a specified sticker, and obtaining an image style of the specified sticker, the recommendation index being used for indicating a priority of recommending the specified sticker to the user; correcting the uncorrected recommendation index according to the use record, the image style of each group of stickers, and the image style of the specified sticker, to obtain a corrected recommendation index; and recommending the specified sticker to the user when the corrected recommendation index satisfies a recommendation condition.

According to another aspect of the embodiments of this application, a sticker recommendation apparatus is provided. The apparatus includes: a record obtaining module, configured to obtain a use record of each group of stickers used by a user, each group of stickers corresponding to at least one image style, and each group of stickers including at least one picture; a recommendation index obtaining module, configured to obtain an uncorrected recommendation index of a specified sticker, and obtain an image style of the specified sticker, the recommendation index being used for indicating a priority of recommending the specified sticker to the user; a correction module, configured to correct the uncorrected recommendation index according to the use record, the image style of each group of stickers, and the image style of the specified sticker, to obtain a corrected recommendation index; and a recommendation module, configured to recommend the specified sticker to the user when the corrected recommendation index satisfies a recommendation condition.

The technical solutions provided in the embodiments of this application may include the following beneficial effects:

After the use record of each group of stickers used by the user, the image style of each group of stickers, and the image style of the specified sticker are obtained to correct the recommendation index of the specified sticker, the sticker is recommended to the user according to the corrected recommendation index. The preference of the user for the image style of the sticker is comprehensively considered, so that personalized sticker recommendation to the user is implemented with reference to the personal preference of the user, thereby improving a sticker recommendation effect for a single user.

It should be understood that the foregoing general descriptions and the following detailed descriptions are merely for exemplary and explanatory purposes, and do not necessarily limit this application.

BRIEF DESCRIPTION OF THE DRAWINGS

The accompanying drawings, which are incorporated herein and constitute a part of this specification, illustrate embodiments consistent with this application and, together with this specification, serve to explain principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

Figure 1:
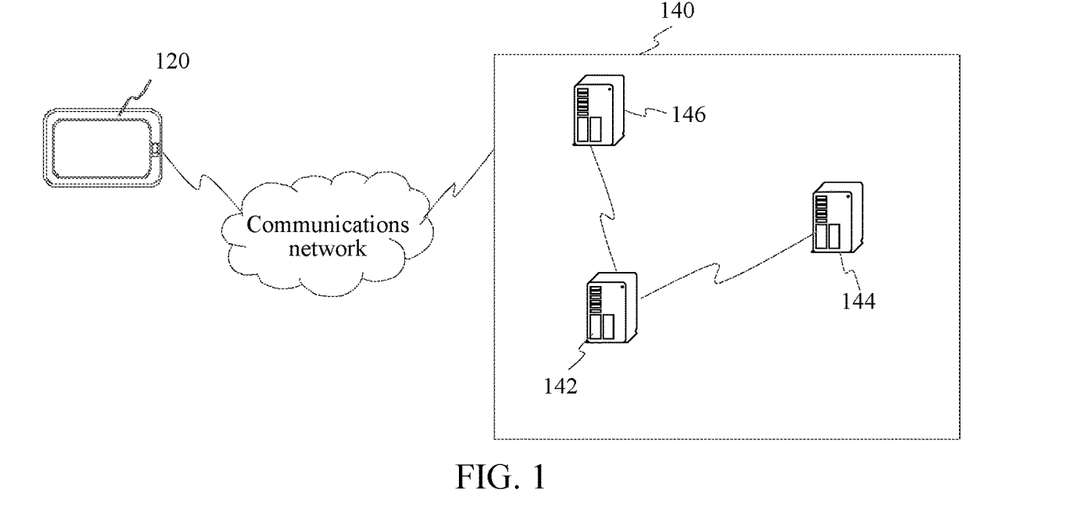
FIG. 1 is a schematic structural diagram of a sticker recommendation system according to an exemplary embodiment.

FIG. 1 is a schematic structural diagram of a sticker recommendation system according to an exemplary embodiment of this application. The system includes several user terminals 120 and a server cluster 140.

The user terminal 120 may be a mobile phone, a tablet computer, an e-book reader, a moving picture experts group audio layer III (MP3) player, a moving picture experts group audio layer IV (MP4) player, a portable laptop computer, a desktop computer, or the like.

The user terminals 120 are connected to the server cluster 140 through a communications network. According to some embodiments, the communications network is a wired network or a wireless network.

The server cluster 140 is a server, a virtualized platform, or a cloud computing service center, or includes several servers. According to some embodiments, the server cluster 140 may include a server configured to implement a sticker management platform 142. According to some embodiments, the server cluster 140 further includes a server configured to implement a social network platform 144. According to some embodiments, the server cluster 140 further includes a user operation record management server 146.

According to some embodiments, the sticker management platform 142 includes a server configured to implement sticker recommendation and a server configured to manage sticker download.

According to some embodiments, the social network platform 144 includes: a server configured to send and receive social information, a server configured to manage and store each user account, a server configured to manage and store each group account, and a server configured to manage a contact list of each user account or group account. The social network platform 144 is connected to the user operation record management server 146 through the communications network.

According to some embodiments, the user operation record management server 146 includes a server configured to collect a historical use record of a sticker used by a user and a server configured to store the historical use record of the sticker used by the user.

According to some embodiments, the user operation record management server 146 may obtain, when granted by the user, sticker operation record data of the user from the local social network platform 144 or another associated social network application platform, and collect, according to the obtained operation record, the historical use record of the sticker used by the user.

According to some embodiments, the system may further include a management device. The management device is connected to the server cluster 140 through a communications network. According to some embodiments, the communications network is a wired network or a wireless network.

According to some embodiments, a standard communications technology and/or a standard communication protocol is used for the wireless network or the wired network. The network is usually the Internet, or may be any network, including but not limited to, any combination of a local area network (LAN), a metropolitan area network (MAN), a wide area network (WAN), a mobile, wired, or wireless network, a private network, and a virtual private network (VPN). In some embodiments, data exchanged through the network is represented by using a technology and/or format including Hypertext Markup Language (HTML), Extensible Markup Language (XML), and the like. In addition, all or some links may further be encrypted by using a conventional encryption technology such as Secure Sockets Layer (SSL), Transport Layer Security (TLS), a VPN, or Internet Protocol Security (IPsec). In some other embodiments, a customized and/or private data communications technology may further be used to replace or supplement the foregoing data communications technology.

A user usually likes a sticker or some stickers due to an image style of the sticker, and different users like different image styles of stickers. In the embodiments of this application, when a sticker is recommended to a user, a use record of each group of stickers used by the user may be obtained. Each group of stickers corresponds to at least one image style, and each group of stickers includes at least one picture. An uncorrected recommendation index of a specified sticker is obtained, and an image style of the specified sticker is obtained. The recommendation index is used for indicating a priority of recommending the specified sticker to the user. The uncorrected recommendation index is corrected according to the use record and the image style of the specified sticker, to obtain a corrected recommendation index. When the corrected recommendation index satisfies a recommendation condition, the specified sticker is recommended to the user.

A quantity of times of using a sticker by the user and the image style of the sticker used by the user can indicate a preference of the user for various image styles of stickers to some extent. Therefore, in the foregoing solution, after the recommendation index of the specified sticker is corrected by using the use record of each group of stickers used by the user, the image style of each group of stickers, and the image style of the specified sticker, the sticker is recommended to the user according to the corrected recommendation index. The preference of the user for the image style of the sticker is comprehensively considered, so that personalized sticker recommendation to the user is implemented with reference to the personal preference of the user, thereby improving a sticker recommendation effect for a single user.

The "user" in this specification may also be understood as a "user account" in a network system and corresponds to a user in reality.

Figure 2:
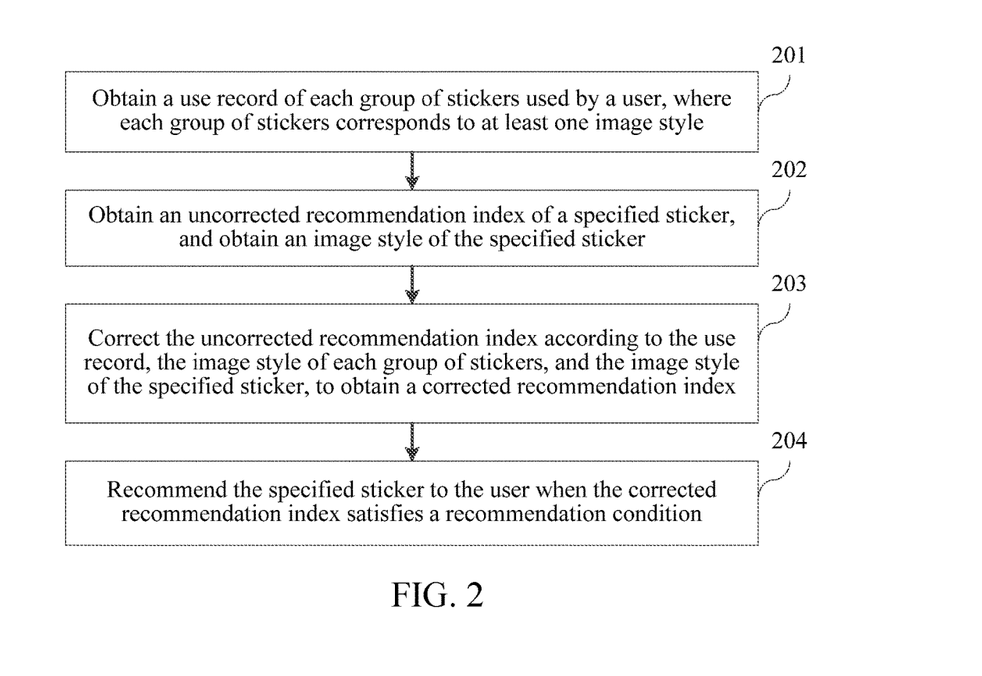
FIG. 2 is a flowchart of a sticker recommendation method according to an exemplary embodiment.

FIG. 2 is a flowchart of a sticker recommendation method according to an exemplary embodiment of this application. Using an example in which the sticker recommendation method is applied to the server cluster in the system shown in FIG. 1, the sticker recommendation method may include the following several steps:

Step 201. Obtain a use record of each group of stickers used by a user, where each group of stickers corresponds to at least one image style, and each group of stickers includes at least one picture.

In this embodiment of this application, the server cluster may preset a classification system of the image styles of the stickers.

Schematically, image styles in a classification system include at least one of a cute 2D sticker, a funny 2D sticker, a cute 3D sticker, a funny 3D sticker, a real-person sticker, a real-animal sticker, and a word art sticker. In this embodiment of this application, various image styles included in the classification system are merely used as an example for description. In an actual application, the server cluster may set more or fewer image styles according to a requirement in the actual application. Types of the image styles in the classification system are not limited in this embodiment of this application.

When developing stickers, a third-party developer usually develops the stickers in sets. Each set of stickers usually includes at least two pictures, and image styles of pictures in the same set of stickers usually remain the same. Therefore, in this embodiment of this application, each set of stickers may be used as a group of stickers that are of one image style.

According to some embodiments, in a process in which the user uses a social network application, the user may create a sticker through doodle, may save a sticker posted by another user in the social network application, may copy a sticker from another social network application and use the sticker in the current social network application, and so on. These stickers usually independently exist and do not exist in a set with other stickers. For this type of stickers, each of these stickers may be separately processed as one group.

In an actual application, each group of stickers may correspond only to one image style, or may correspond to two or more image styles. For example, using the classification system as an example, a group of stickers may correspond only to the image style of cute 3D sticker, or may correspond to two image styles, namely, the cute 3D sticker and the real-person sticker.

For a group of stickers, when the group of stickers includes only one picture, an image style of the group of stickers is an image style of the picture. When the group of stickers includes at least two pictures, an image style of the group of stickers is an image style of each picture in the group of stickers. For example, when a group of stickers includes 10 pictures, if an image style of the group of stickers is the cute 3D sticker, it indicates that an image style of each of the 10 pictures is the cute 3D sticker; or if an image style of the group of stickers includes two image styles, namely, the cute 3D sticker and the real-person sticker, it indicates that an image style of each of the 10 pictures includes the cute 3D sticker and the real-person sticker.

According to some embodiments, the step of obtaining a use record of each group of stickers used by a user may be performed by the user operation record management server 146 in the server cluster shown in FIG. 1. For example, the user operation record management server 146 may obtain an operation record of the user in the social network application from the social network platform 144, extract, from the operation record, an operation record of using the stickers by the user, and generate, through statistics, the use record of each group of stickers used by the user.

Schematically, using an example in which the use record includes a quantity of times of using each group of stickers by the user, the user operation record management server 146 collects a sticker used by the user each time, and increases a quantity of use times corresponding to a group of stickers in which the sticker is located by 1, to finally obtain the quantity of times of using each group of stickers by the user.

According to some embodiments of this application, the use record of each group of stickers used by the user is specifically a use record of each group of stickers used by the user. That is, the use record obtained in step 201 is a use record of each group of stickers of the current user.

According to some embodiments, that the user uses a sticker may be that, the user posts the sticker by using a social application message in the social network application. The social application message may be an instant messaging message or a personal dynamic. That is, that the user uses a sticker may be that, the user posts the sticker by using an instant messaging window, a group chat window, or the personal dynamic.

In an actual application, in the process in which the user posts a sticker by using a social application message, the user may post two or more same stickers in the same social application message (where for example, the user posts a plurality of totally same stickers in a message or a personal dynamic). To avoid interference of this case and accurately collect a frequency of using each group of stickers by the user, when the user operation record management server 146 collects the sticker used by the user each time, for a plurality of same stickers posted in the same social application message, a quantity of use times corresponding to a group of stickers in which the sticker is located is increased by 1 corresponding to the social application message.

For example, using an example in which a group of stickers includes a sticker 1 and a sticker 2, when the user posts a personal dynamic, three stickers 1 and two stickers 2 are posted in one personal dynamic. Therefore, when collecting the use record of the sticker used by the user, the user operation record management server 146 increases a quantity of use times corresponding to the group of stickers by 1 for the sticker 1 in the personal dynamic, and increases the quantity of use times corresponding to the group of stickers by 1 for the sticker 2 in the personal dynamic.

Alternatively, in another possible implementation, when the user posts two or more same stickers in the same social application message, it may be considered that the user favors the sticker. Therefore, when the user operation record management server 146 collects the sticker used by the user each time, for a plurality of same stickers posted in the same social application message, the user operation record management server 146 adds, corresponding to the social application message, a quantity of stickers in the social application message to a quantity of use times corresponding to a group of stickers in which the sticker is located.

For example, using an example in which a group of stickers includes a sticker 1 and a sticker 2, when the user posts a personal dynamic, three stickers 1 and two stickers 2 are posted in one personal dynamic. Therefore, when collecting the use record of the sticker used by the user, the user operation record management server 146 increases a quantity of use times corresponding to the group of stickers by 3 for the sticker 1 in the personal dynamic, and increases the quantity of use times corresponding to the group of stickers by 2 for the sticker 2 in the personal dynamic.

According to some embodiments, the user may favor an image style of a sticker in a period. For example, the user uses the cute 2D sticker for a relatively large quantity of times once in a period of time, and may prefer to use the real-person sticker in another period of time. Therefore, to improve recommendation accuracy, in this embodiment of this application, when obtaining the use record of each group of stickers used by the user, the user operation record management server 146 may obtain a use record of each group of stickers used by the user in a preset-length time period closest to a current time, so that a subsequent recommendation result can be closer to a preference of the user in the last period of time. A time length of the preset-length time period may be manually set by a manager, or may be a fixed time length set in the user operation record management server 146 by default. For example, assuming that the fixed time length is one month, when obtaining the use record of each group of stickers used by the user, the user operation record management server 146 may obtain a use record of each group of stickers that is within the last month closest to the current time.

Step 202. Obtain an uncorrected recommendation index of a specified sticker, and obtain an image style of the specified sticker.

The recommendation index may be used for indicating a priority of recommending the specified sticker to the user. For example, a larger value of the recommendation index indicates that the specified sticker is easier to be accepted by the user when the specified sticker is recommended to the user.

The specified sticker may also be referred to as another possible name such as a target sticker or a preset sticker.

According to some embodiments, the server cluster may calculate the uncorrected recommendation index of the specified sticker according to a collaborative-filtering-based recommendation algorithm. Alternatively, the server cluster calculates the uncorrected recommendation index of the specified sticker based on another recommendation algorithm. The uncorrected recommendation index may also be referred to as an initial recommendation index.

Specifically, step 202 may be performed by the sticker management platform 142 in the server cluster shown in FIG. 1. The collaborative-filtering-based recommendation algorithm is a general term of a type of recommendation algorithms. A core idea of the collaborative-filtering-based recommendation algorithm is: A user-item matrix, that is, a user-item (where the item is each group of stickers in this embodiment of this application) score matrix, is first constructed, then a user-item matrix of another user having a similar preference to that of a current user (that is, another user favoring the same sticker as that of the current user) is found by using the collaborative-filtering-based recommendation algorithm according to the constructed user-item matrix, and a sticker that may be liked by the user is predicted according to the user-item matrix of the another user having the similar preference to that of the current user.

For example, it is assumed that a higher frequency of using a group of stickers by the user indicates a higher preference of the user for the group of stickers. That is, the frequency of using each group of stickers by the user is used for replacing a user score in a general meaning. The sticker management platform 142 constructs, according to the frequency of using each group of stickers by each user, a user-item matrix corresponding to each user. In a user-item matrix corresponding to a user, each element corresponds to a frequency of using one group of stickers by the user. Different users have different use habits, and in the constructed user-item matrices corresponding to different users, original values indicating frequencies of using each group of stickers by the users greatly differ from each other. Therefore, to reduce complexity in a subsequent computing process, before further processing, the sticker management platform 142 normalizes the constructed user-item matrix of each user. The normalization herein means separately normalizing the user-item matrix corresponding to each user. That is, for each user, a value of each element in the user-item matrix of the user is equal to a value obtained by dividing a frequency of using a group of stickers corresponding to the element by the user by a maximum value in a frequency of using each group of stickers by the user. A formula is as follows:

$$uimatrix[u, e] = \frac{f(u, e)}{\max_{e=1}^{K}(f(u, e))}$$

f(u,e) is a frequency of using a group of stickers e by a user u, and K is a quantity of groups of all stickers. uimatrix[u,e] is a value obtained after normalization of an element corresponding to the group of stickers e in a user-item matrix corresponding to the user. Each group of stickers not used by the user (that is, each group of stickers corresponding to f(u,e)=0) is stickers needing to be predictively scored (that is, to obtain the recommendation index) by using the recommendation algorithm.

After the user-item matrix of each user is normalized, the sticker management platform 142 finds out, by using the collaborative-filtering-based recommendation algorithm based on the user-item matrix of each user, the user-item matrix of the another user having the similar preference to that of the current user, and calculates a predictor of an element being 0 in the user-item matrix of the current user with reference to the user-item matrix of the another user having the similar preference to that of the current user. A sticker corresponding to the element being 0 in the user-item matrix of the current user may be the specified sticker. The recommendation index of the specified sticker may be obtained by using the predictor of the element. For example, the predictor of the element may be directly used as the recommendation index of the specified sticker. That is, for each user, a recommendation index of each group of stickers not used by the user is calculated and used as a recommendation basis.

According to some embodiments, the example in which the uncorrected recommendation index is obtained based on the collaborative-filtering-based recommendation algorithm is used for description in the foregoing solution. In an actual application, the server cluster may alternatively obtain the uncorrected recommendation index by using another type of recommendation algorithm according to an actual application requirement. For example, the another type of recommendation algorithm may include a content-based recommendation algorithm, an association-rule-based recommendation algorithm, a knowledge-based recommendation algorithm, and the like. Even more, the server cluster may alternatively obtain the uncorrected recommendation index according to a combination of two or more recommendation algorithms. The recommendation algorithm used by the server cluster for obtaining the uncorrected recommendation index is not limited in this embodiment of this application.

According to some embodiments, in another possible implementation, the server cluster may not obtain the uncorrected recommendation index by using a specific recommendation algorithm. For example, the server cluster may set the uncorrected recommendation index of the specified sticker to a fixed value, and uncorrected recommendation indexes of all to-be-recommended stickers are the same. That is, the server cluster recommends a sticker to the user according only to the use record of each group of stickers used by the user but not with reference to another recommendation algorithm.

Step 203: Correct the uncorrected recommendation index according to the use record, the image style of each group of stickers, and the image style of the specified sticker, to obtain a corrected recommendation index.

According to some embodiments, the step includes the following two substeps:

Substep 1. Generate an interest vector of the user according to the use record of each group of stickers used by the user and the image style of each group of stickers.

Substep 2. Correct the recommendation index of the specified sticker according to the interest vector, the image style of the specified sticker, and a preset correction formula, to obtain the corrected recommendation index.

According to some embodiments, a technical solution corresponding to substep 1 includes the following content:

Each element in the interest vector indicates a quantity of times of using a sticker that is of one image style by the user.

According to some embodiments, when the use record includes a quantity of times of using each group of stickers by the user, a process of generating the interest vector of the user may be described in the following step a to step c.

Step a. Generate an initialized interest vector according to a quantity of image styles, where a value of an element corresponding to each image style in the initialized interest vector is 1.

When using stickers, generally, the user uses stickers of only several image styles, and may never use stickers of most image styles. To prevent the vector from being excessively sparse due to excessive values being 0 in the interest vector of the user and to improve accuracy of subsequent calculation, in the method described in this embodiment of this application, it may be considered by default that the user uses a sticker of each image style at least once. That is, the initialized interest vector is an all-ones vector v=[1, 1, . . . , 1], a quantity of elements in the vector v is a quantity (assuming to be n) of image styles in the classification system of the stickers, and each element in the vector v corresponds to one of the image styles.

Step b. For each group of stickers, add a value of an element corresponding to an image style of the group of stickers in the initialized interest vector to a quantity of times of using the group of stickers by the user, to obtain a vector after the addition.

The server cluster may collect all the stickers used by the user and frequencies of the stickers according to the use record. For each group of stickers and a corresponding use frequency m, the element, for example, an $i^{th}$ element, corresponding to the image style corresponding to the group of stickers in the vector v is determined, and then m is added to the $i^{th}$ element in the vector v, that is:

$$v[i]=v[i]+m$$

For example, assuming that the first element in the vector v corresponds to the cute 2D sticker, the second element corresponds to the funny 2D sticker, the last element corresponds to the wordart sticker, and it is determined through statistics according to the use record that a quantity of times of using the cute 2D sticker by the user is 200, a quantity of times of using the funny 2D sticker is 0, and a quantity of times of using the wordart sticker is 30, the vector obtained through addition is v=[201, 1, . . . , 31].

According to some embodiments, when one group of stickers corresponds to two or more image styles, each time the user uses a use record of the group of stickers, quantities of times of using stickers of the two or more image styles by the user are respectively increased by 1.

For example, a group of stickers corresponds to the cute 2D sticker and the real-person sticker, and a quantity of times of using the group of stickers by the user is 10. Therefore, when quantities of times of using the cute 2D sticker and the real-person sticker by the user are collected, the quantities of times of using the cute 2D sticker and the real-person sticker by the user are respectively increased by 10 according to a use record of the group of stickers used by the user.

Step c. Normalize the vector obtained through addition, to obtain the interest vector of the user.

When normalizing the vector obtained through addition, the server cluster may divide all elements in the vector v by a length of the vector v, so that a length of the interest vector of the user that is obtained after the normalization is 1. A normalization formula is as follows:

$$v[i] = \frac{v[i]}{\sqrt{\sum_{j=1}^{n} v[i]^2}}$$

v[i] is an $i^{th}$ element in the vector v, v[j] is a $i^{th}$ element in the vector v, and n is the length of the vector v.

A technical solution corresponding to substep 2 includes the following content:

According to some embodiments, the correction formula is:

$$rp(u, e) = cf(u, e) * \left(1 + \left(\frac{2}{1 + \exp(-0.1 * frq(u))} - 1\right) * \text{var}(v(u)) * sim(e, v(u))\right)$$

rp(u,e) is the corrected recommendation index, cf(u,e) is the uncorrected recommendation index, and V(u) is the interest vector of the user.

In addition, frq(u) is an average quantity of times of using the stickers by the user per unit of time period. The unit of time period may be a preset time period having fixed duration. For example, the unit of time period may be one day or an hour. The average quantity of times of using the stickers by the user per unit of time period is a quantity of use times obtained by averaging a collected total quantity of times of using each group of stickers by the user in the use record to each unit of time period corresponding to the use record. For example, assuming that the use record is a use record of the user within 30 days, the unit of time period is one day, and the collected total quantity of times of using the stickers by the user in the use record is 10000, the average quantity of times of using the stickers by the user per unit of time period is 10000/30333 times.

$$\frac{2}{1 + \exp(-0.1 * frq(u))} - 1$$

in the foregoing formula is a function related to the average quantity of times of using the stickers by the user per unit of time period.

Figure 3:
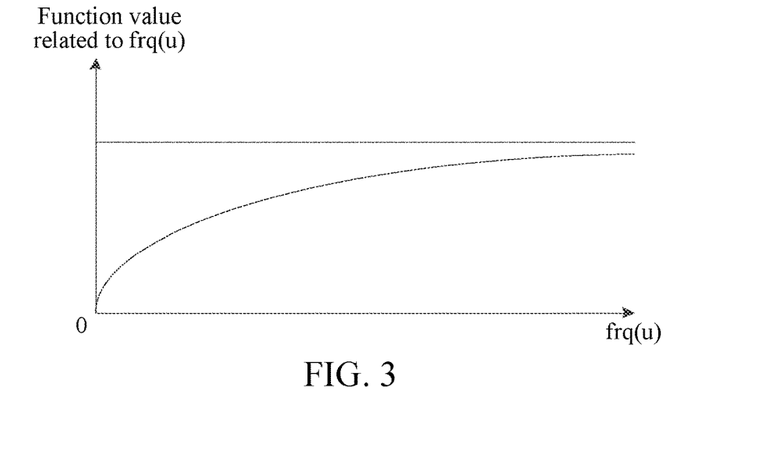
FIG. 3 is a schematic diagram of a function graph related to the embodiment shown in FIG. 2.

FIG. 3 is a schematic diagram of a function graph according to an embodiment of this application. As shown in FIG. 3, the function related to the average quantity of times of using the stickers by the user per unit of time period is half an s-shaped function. When an average use frequency of the user per unit of time period is 0, a value of the function is 0, indicating that reliability of correcting the recommendation index by using the interest vector of the user is 0 and the interest vector is completely unavailable. As the average use frequency of the user per unit of time period increases, the function first obviously increases and then gradually becomes gentle, and has a limit value of 1.0. This change trend indicates that as the average frequency of using the stickers by the user per unit of time period increases, correcting the recommendation index by using the interest vector of the user becomes more reliable.

var(v(u)) in the foregoing formula is a variance value of each element in the interest vector of the user. A larger variance value indicates less centralized image styles of the stickers used by the user. Otherwise, a larger variance value indicates more dispersed image styles of the stickers used by the user. If the image styles of the stickers used by the user are more centralized, an amplitude of correcting the recommendation index by using the formula is smaller; otherwise, an amplitude of correcting the recommendation index by using the formula is larger.

sim(e,v(u)) in the foregoing formula is a cosine similarity between the specified sticker and the interest vector.

When calculating the cosine similarity, the server cluster may determine an image style vector corresponding to the specified sticker. The image style vector is similar to the interest vector of the user and also includes n elements. Each element corresponds to a image style, a value of an element corresponding to the image style of the specified sticker is 1, and other elements are all 0. The server cluster selects elements not being 0 at corresponding locations in both the image style vector and the interest vector of the user, multiplies and sums the elements to obtain a value, and divides the value by lengths of the two vectors. An obtained result is the cosine similarity.

According to some embodiments, when the specified sticker corresponds only to one image style, the interest vector v(u) of the user is normalized, and in vector space of the same dimension, a value of only one element (assuming to be an $i^{th}$ element) corresponding to the specified sticker is 1 and other values are all 0. In this case, there is only one group of elements not being 0 at corresponding locations in both the image style vector and the interest vector of the user, and the lengths of the two vectors are both 1. Therefore, according to the foregoing cosine similarity calculation formula, the value of the $i^{th}$ element in the interest vector of the user is the cosine similarity. That is, when the specified sticker corresponds only to one image style, a calculation method for the cosine similarity is: first determining an element (assuming to be an $i^{th}$ element) corresponding to the image style of the specified sticker in the interest vector v(u) of the user, and then determining a value of sim(e,v(u)) as a value of the $i^{th}$ element of the vector v(u).

Step 204. Recommend the specified sticker to the user when the corrected recommendation index satisfies a recommendation condition.

The recommendation condition may include at least one of the following conditions:

the corrected recommendation index is greater than a preset index threshold, and a rank of the corrected recommendation index in recommendation indexes of to-be-recommended stickers is greater than a preset rank threshold.

In this embodiment of this application, after correcting the recommendation index of the specified sticker to be recommended to the user, the server cluster may determine, according only to the corrected recommendation index of the specified sticker, whether to recommend the specified sticker. For example, the server cluster may preset the index threshold (where a manager may manually set a value), and may recommend the specified sticker to the user when the corrected recommendation index is higher than the index threshold.

Alternatively, the server cluster may determine, with reference to a recommendation index of another to-be-recommended sticker, whether to recommend the specified sticker. For example, the server cluster may sort the to-be-recommended stickers according to corrected recommendation indexes corresponding to the to-be-recommended stickers, and recommend stickers at first x ranks to the user. If the specified sticker is in the first x ranks, the server cluster recommends the specified sticker to the user. x is the rank threshold, and may be a value set by the manager in the service cluster or may be a value set by default in the server cluster.

Alternatively, the server cluster may determine, with reference to a rank of the recommendation index and a specific value of the recommendation index, whether to recommend the specified sticker. For example, the server cluster may sort the to-be-recommended stickers according to corrected recommendation index of the to-be-recommended stickers. If the specified sticker is in the first x ranks and the corrected recommendation index of the specified sticker is greater than the index threshold, the server cluster recommends the specified sticker to the user. Otherwise, if the specified sticker is out of the first x ranks or the corrected recommendation index of the specified sticker is not greater than the index threshold, the server cluster does not recommend the specified sticker to the user.

According to some embodiments of this application, the specified sticker may be any group of pictures in the stickers to be recommended to the user, which means that after the stickers are classified, a recommendation index of any group of stickers may be corrected by using the method described in this embodiment of this application. Alternatively, the specified sticker may be any one of several groups of stickers having highest corresponding uncorrected recommendation indexes in the stickers to be recommended to the user.

According to some embodiments of this application, the server cluster may regularly perform step S201 to step S24, for example, perform the foregoing solution by using half a month or one month as a period, to regularly update the stickers to be recommended to the user.

In conclusion, according to the sticker recommendation method provided in this embodiment of this application, after the recommendation index of the specified sticker is corrected by using the use record of each group of stickers used by the user, the image style of each group of stickers, and the image style of the specified sticker, the sticker is recommended to the user according to the corrected recommendation index. The preference of the user for the image style of the sticker is comprehensively considered, so that personalized sticker recommendation to the user is implemented with reference to the personal preference of the user, thereby improving a sticker recommendation effect for a single user.

In addition, according to the method provided in this embodiment of this application, the uncorrected recommendation index is calculated by using the collaborative-filtering-based recommendation algorithm, and the uncorrected recommendation index is corrected with reference to the personal preference of the user for the image style of the sticker, to recommend the sticker to the user with reference to the personal preference of the user and the collaborative-filtering-based recommendation algorithm.

In addition, according to the method provided in this embodiment of this application, during generation of the interest vector of the user, the initialized interest vector in which the value of the element corresponding to each image style is 1 is first generated, and the quantity of times of using the sticker that is of each image style is added to the initialized interest vector, to obtain the vector through addition and perform normalization processing, to prevent the vector from being excessively sparse due to excessive values of 0 in the interest vector of the user, thereby improving the accuracy of the subsequent calculation.

In addition, according to the method provided in this embodiment of this application, when the recommendation index of the specified sticker is corrected, impact of the average quantity of times of using the stickers by the user per unit of time period and interest centralization of the user on the correction are comprehensively considered, thereby improving accuracy of correction of the recommendation index.

Figure 4:
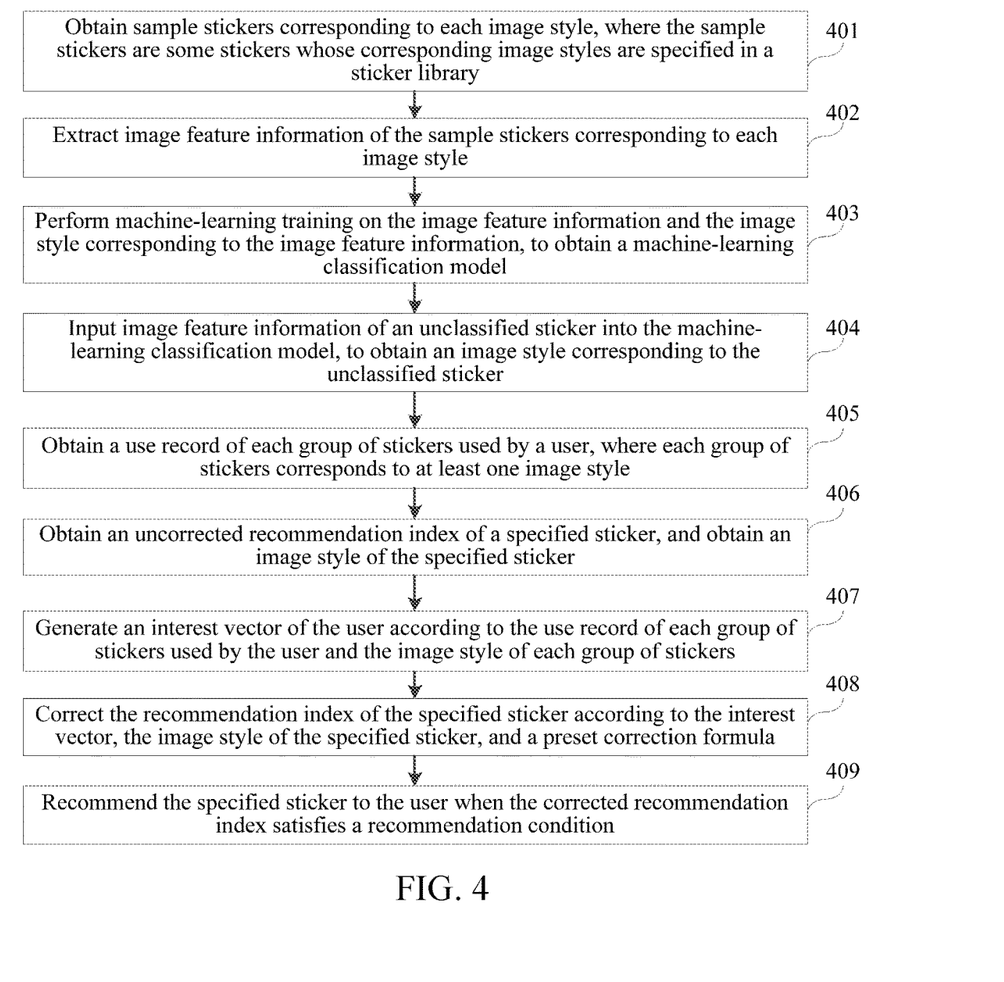
FIG. 4 is a flowchart of a sticker recommendation method according to an exemplary embodiment.

FIG. 4 is a flowchart of a sticker recommendation method according to an exemplary embodiment. Using an example in which the sticker recommendation method is applied to the server cluster in the system shown in FIG. 1, the sticker recommendation method may include the following several steps:

Step 401. Obtain sample stickers corresponding to each image style, where the sample stickers are some stickers whose corresponding image styles are specified in a sticker library.

The sticker library includes each group of stickers used by a user and a specified sticker. For example, using the system shown in FIG. 1 as an example, the sticker library may be a database set in the sticker management platform 142 for storing stickers. The sticker library stores each group of stickers existing in the system. For a single user, in addition to each group of stickers used by the user, the sticker library further stores a specified sticker that is not used by the user and that may be recommended to the user.

In this embodiment of this application, the sample stickers may be manually labeled by a manager. The server cluster obtains the sample stickers that are manually labeled and that correspond to each image style.

The sample stickers may be labeled in groups. For example, after constructing a classification system of image styles of stickers, the manager may first label, in all groups of stickers in the sticker library, at least one group of stickers corresponding to each image style. A quantity of groups of stickers labeled for each image style may be determined by the manager according to an actual case. For example, comprehensively considering labor costs and a subsequent machine learning effect, in a classification system having normal difficulty, 50 groups of stickers may be approximately labeled for each image style.

Step 402. Extract image feature information of the sample stickers corresponding to each image style.

In this embodiment of this application, the server cluster may perform image classification by using a machine-learning classification model suitable for image classification.

Currently, machine-learning classification models suitable for image classification are mainly classified into two types. One type is a conventional machine-learning classification model, for example, a support vector machine (SVM) model, a maximum-entropy model, or a random forest model. The other type is a deep neural network model, for example, a convolutional neural network model. Manners required by the two types of machine-learning classification models for extracting image feature information are also different.

Specifically, if the conventional machine-learning classification model is used, the server cluster may extract the image feature information from the sample stickers corresponding to each image style by using an image feature extraction algorithm such as a scale-invariant feature transform (SIFT), speed-up robust features (SURF), oriented fast and rotated brief (ORB), a histogram of oriented gradient (HOG), or a local binary pattern (LBP).

If the deep neural network model is used, the server cluster may extract a red green blue (RGB) color value of each pixel point from the sample stickers corresponding to each image style as the image feature information.

Step 403. Perform machine-learning training on the image feature information and the image style corresponding to the image feature information, to obtain a machine-learning classification model.

After extracting the image feature information of the sample stickers corresponding to each image style in the foregoing step, the server cluster may input the image feature information and the image style corresponding to the image feature information into a selected machine model for training, to obtain the machine-learning classification model used for sticker classification.

Step 404. Input image feature information of an unclassified sticker into the machine-learning classification model, to obtain an image style corresponding to the unclassified sticker.

After the machine-learning classification model is trained, for each of other unclassified groups of stickers (that is, groups of stickers whose image styles are not labeled by the manager), the server cluster may extract image feature information of each group of stickers according to a corresponding machine-learning classification model, and input the image feature information of each group of stickers into the machine-learning classification model. Then, the machine-learning classification model may output an image style corresponding to each group of stickers.

Step 405. Obtain a use record of each group of stickers used by a user, where each group of stickers corresponds to at least one image style, and each group of stickers includes at least one picture.

Step 406. Obtain an uncorrected recommendation index of a specified sticker, and obtain an image style of the specified sticker.

Step 407. Generate an interest vector of the user according to the use record of each group of stickers used by the user and the image style of each group of stickers.

Step 408. Correct the recommendation index of the specified sticker according to the interest vector, the image style of the specified sticker, and a preset correction formula, to obtain a corrected recommendation index.

Step 409. Recommend the specified sticker to the user when the corrected recommendation index satisfies a recommendation condition.

For execution processes of step 405 to step 409, refer to the corresponding descriptions of step 201 to step 204 in the embodiment shown in FIG. 2, and details are not described herein again.

In conclusion, according to the sticker recommendation method provided in this embodiment of this application, after the recommendation index of the specified sticker is corrected by using the use record of each group of stickers used by the user, the image style of each group of stickers, and the image style of the specified sticker, the sticker is recommended to the user according to the corrected recommendation index. The preference of the user for the image style of the sticker is comprehensively considered, so that personalized sticker recommendation to the user is implemented with reference to the personal preference of the user, thereby improving a sticker recommendation effect for a single user.

In addition, according to the method provided in this embodiment of this application, the image feature information of the sample stickers corresponding to each image style is obtained; machine-learning training is performed on the image feature information and the image style corresponding to the image feature information, to obtain the machine-learning classification model; and the image feature information of the unclassified sticker is input into the machine-learning classification model, to obtain the image style corresponding to the unclassified sticker, thereby implementing automatic classification of the image style of each group of stickers.

Figure 5:
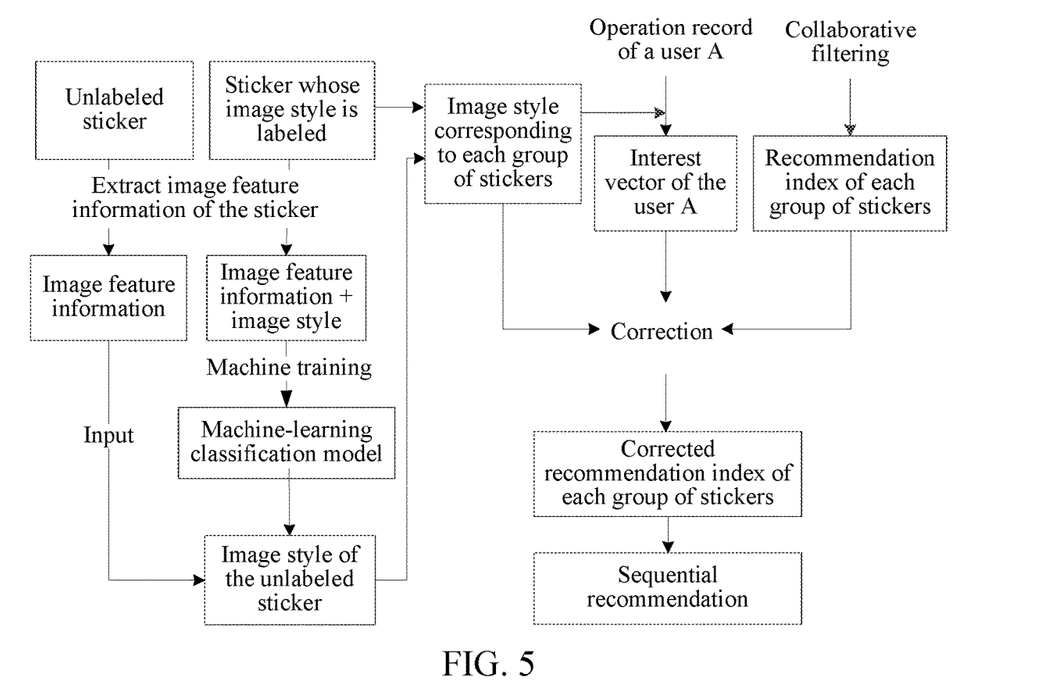
FIG. 5 is a schematic diagram of an implementation process of recommending a sticker to a user by a server cluster.

Specifically, FIG. 5 is a schematic diagram of an implementation process of recommending a sticker to a user by a server cluster. An example in which the implementation process may be implemented by the sticker management platform 142, the social network platform 144, and the user operation record management server 146 in the server cluster shown in FIG. 1 is used. As shown in FIG. 5, a manager labels image styles of some stickers in a sticker library of the sticker management platform 142 by using the management device. 50 groups of stickers are approximately labeled for each image style. The sticker management platform 142 obtains the stickers whose image styles are labeled by the manager as sample stickers corresponding to each image style, extracts image feature information of the sample stickers, and performs machine learning on the extracted image feature information of the sample stickers and the image style (that is, the image style labeled by the user) corresponding to the image feature information, to obtain a machine-learning classification model. The sticker management platform 142 extracts, by using the same method, image feature information of each of other groups of stickers whose image styles are not labeled in the sticker library, inputs the image feature information of each group of stickers into the machine-learning classification model, and outputs an image style corresponding to each group of stickers, to obtain the image style corresponding to each group of stickers managed in the sticker management platform 142.

On the other hand, that a user A uses a social network application by using the user terminal 120 includes using a sticker in the social network application. The social network platform 144 collects an operation record of the user A, and sends the collected operation record of the user A to the user operation record management server 146. The user operation record management server 146 generates, according to the operation record of the user A at an interval of a preset period, for example, at an interval of one month, a use record of each group of stickers used by the user A within the last month. The use record includes a quantity of times of using each group of stickers by the user A. The user operation record management server 146 provides the generated use record for the sticker management platform 142.

After obtaining the use record of each group of stickers used by the user A in the last month, the sticker management platform 142 generates an interest vector of the user A with reference to the use record and the image style of each group of stickers. In addition, the sticker management platform 142 further calculates, by using a collaborative-filtering-based recommendation algorithm according to a use record of each group of stickers used by each user (and/or specifically by user A) within the last month, an uncorrected recommendation index of each group of stickers that is to be recommended to the user A and that is not used by the user A. The sticker management platform 142 corrects the uncorrected recommendation index by using the interest vector of the user A, sorts, according to the corrected recommendation index, each group of stickers not used by the user A, and recommends, to the user A according to a sorting result, several groups of stickers having highest recommendation indexes.

Figure 6:
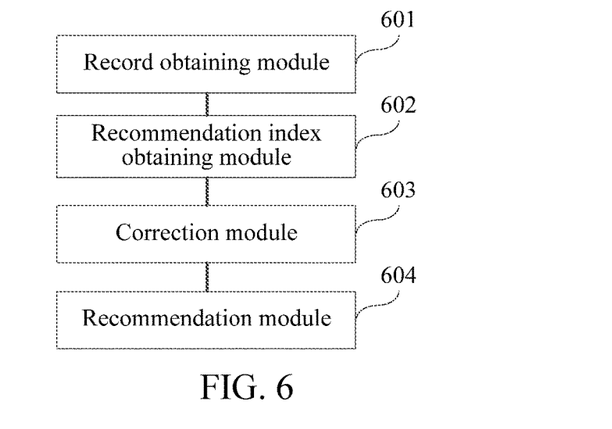
FIG. 6 is a structural block diagram of a sticker recommendation apparatus according to an exemplary embodiment.

FIG. 6 is a structural block diagram of a sticker recommendation apparatus according to an exemplary embodiment. The sticker recommendation apparatus may be implemented as a part or all of a server cluster by using hardware or a combination of software and hardware, to perform all or some steps in the embodiment shown in FIG. 2 or FIG. 4. The sticker recommendation apparatus may include: a record obtaining module 601, a recommendation index obtaining module 602, a correction module 603, and a recommendation module 604.

The record obtaining module 601 is configured to obtain a use record of each group of stickers used by a user, where each group of stickers corresponds to at least one image style, and each group of stickers includes at least one picture.

For a specific step performed by the record obtaining module 601, refer to the descriptions of step 201 in FIG. 2, and details are not described herein again.

The recommendation index obtaining module 602 is configured to obtain an uncorrected recommendation index of a specified sticker, and obtain an image style of the specified sticker, where the recommendation index is used for indicating a priority of recommending the specified sticker to the user.

The correction module 603 is configured to correct the uncorrected recommendation index according to the use record, the image style of each group of stickers, and the image style of the specified sticker, to obtain a corrected recommendation index.

The recommendation module 604 is configured to recommend the specified sticker to the user when the corrected recommendation index satisfies a recommendation condition.

For a specific step performed by the recommendation module 604, refer to the descriptions of step 204 in FIG. 2, and details are not described herein again.

According to some embodiments, the correction module 603 includes a vector generation unit and a correction unit.

The vector generation unit is configured to generate an interest vector of the user according to the use record of each group of stickers and the image style of each group of stickers, where each element in the interest vector indicates a quantity of times of using a sticker that is of one image style by the user.

The correction unit is configured to correct the recommendation index of the specified sticker according to the interest vector, the image style of the specified sticker, and a preset correction formula.

For a specific step performed by the correction unit, refer to the descriptions of step 204 in FIG. 2, and details are not described herein again.

According to some embodiments, the use record includes a quantity of times of using each group of stickers by the user, and the vector generation unit includes a generation subunit, an addition subunit, and a normalization subunit.

The generation subunit is configured to generate an initialized interest vector according to a quantity of image styles, where a value of an element corresponding to each image style in the initialized interest vector is 1.

The addition subunit is configured to: for each group of stickers, add a value of an element corresponding to an image style of the group of stickers in the initialized interest vector to a quantity of times of using the group of stickers by the user, to obtain a vector after the addition.

The normalization subunit is configured to normalize the vector obtained through addition, to obtain the interest vector of the user.

For a specific step performed by the vector generation unit, refer to the descriptions of step 203 in FIG. 2, and details are not described herein again.

According to some embodiments, the correction formula is:

$$rp(u,e) = cf(u,e) * \left(1 + \left(\frac{2}{1+\exp(-0.1*frq(u))} - 1\right) * \text{var}(v(u)) * sim(e, v(u))\right),$$

where rp(u,e) is the corrected recommendation index, cf(u,e) is the uncorrected recommendation index, frq(u) is an average quantity of times of using the stickers by the user per unit of time period, v(u) is the interest vector, var(v(u)) is a variance value of each element in the interest vector, and sim(e,v(u)) is a cosine similarity between the specified sticker and the interest vector.

According to some embodiments, the recommendation index obtaining module 602 is configured to calculate the uncorrected recommendation index of the specified sticker according to a collaborative-filtering-based recommendation algorithm.

For a specific step performed by the recommendation index obtaining module 602, refer to the descriptions of step 202 in FIG. 2, and details are not described herein again.

According to some embodiments, the recommendation condition includes at least one of the following conditions:

the corrected recommendation index is greater than a preset index threshold; and a rank of the corrected recommendation index in recommendation indexes of to-be-recommended stickers is greater than a preset rank threshold.

According to some embodiments, the apparatus further includes: a sample obtaining module, a feature extraction module, a training module, and an image style obtaining module.

The sample obtaining module is configured to obtain, before the record obtaining module obtains the use record of each group of stickers used by the user, sample stickers corresponding to each image style, where the sample stickers are some stickers whose corresponding image styles are specified in a sticker library, and the sticker library includes each group of stickers used by the user and the specified sticker.

For a specific step performed by the sample obtaining module, refer to the descriptions of step 401 in FIG. 4, and details are not described herein again.

The feature extraction module is configured to extract image feature information of the sample stickers corresponding to each image style.

For a specific step performed by the feature extraction module, refer to the descriptions of step 402 in FIG. 4, and details are not described herein again.

The training module is configured to perform machine-learning training on the image feature information and the image style corresponding to the image feature information, to obtain a machine-learning classification model.

For a specific step performed by the training module, refer to the descriptions of step 403 in FIG. 4, and details are not described herein again.

The image style obtaining module is configured to input image feature information of an unclassified sticker into the machine-learning classification model, to obtain an image style corresponding to the unclassified sticker, where the unclassified sticker is a sticker in the sticker library other than the sample stickers.

For a specific step performed by the image style obtaining module, refer to the descriptions of step 404 in FIG. 4, and details are not described herein again.

In conclusion, according to the sticker recommendation apparatus provided in this embodiment of this application, after the recommendation index of the specified sticker is corrected by using the use record of each group of stickers used by the user, the image style of each group of stickers, and the image style of the specified sticker, the sticker is recommended to the user according to the corrected recommendation index. The preference of the user for the image style of the sticker is comprehensively considered, so that personalized sticker recommendation to the user is implemented with reference to the personal preference of the user, thereby improving a sticker recommendation effect for a single user.

In addition, according to the apparatus provided in this embodiment of this application, the uncorrected recommendation index is calculated by using the collaborative-filtering-based recommendation algorithm, and the uncorrected recommendation index is corrected with reference to the personal preference of the user for the image style of the sticker, to recommend the sticker to the user with reference to the personal preference of the user and the collaborative-filtering-based recommendation algorithm.

In addition, according to the apparatus provided in this embodiment of this application, during generation of the interest vector of the user, the initialized interest vector in which the value of the element corresponding to each image style is 1 is first generated, and the quantity of times of using the sticker that is of each image style is added to the initialized interest vector, to obtain the vector through addition and perform normalization processing, to prevent the vector from being excessively sparse due to excessive values of 0 in the interest vector of the user, thereby improving the accuracy of the subsequent calculation.

In addition, according to the apparatus provided in this embodiment of this application, when the recommendation index of the specified sticker is corrected, impact of an average quantity of times of using the stickers by the user per unit of time period and interest centralization of the user on the correction are comprehensively considered, thereby improving accuracy of correction of the recommendation index.

In addition, according to the apparatus provided in this embodiment of this application, the image feature information of the sample stickers corresponding to each image style is obtained; machine-learning training is performed on the image feature information and the image style corresponding to the image feature information, to obtain the machine-learning classification model; and the image feature information of the unclassified sticker is input into the machine-learning classification model, to obtain the image style corresponding to the unclassified sticker, thereby implementing automatic classification of the image style of each group of stickers.

Figure 7:
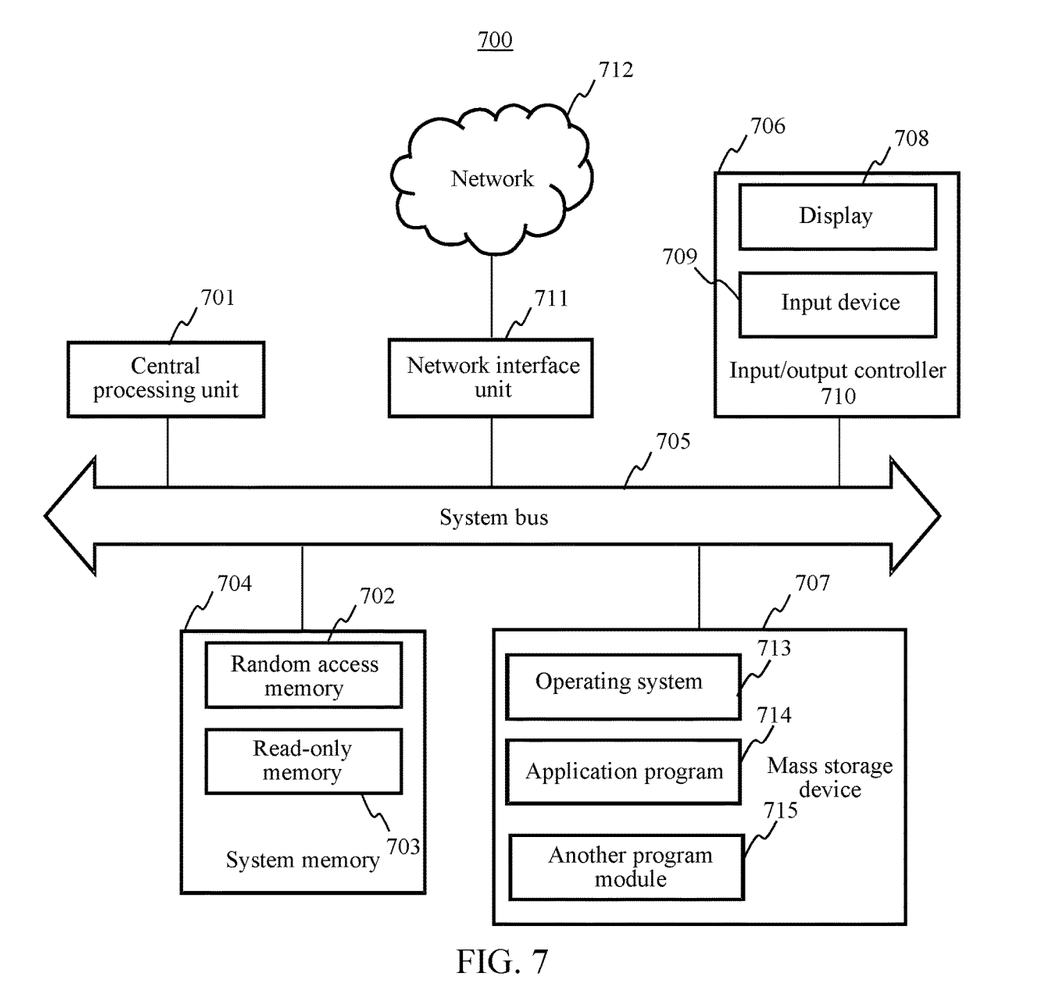
FIG. 7 is a schematic structural diagram of a server cluster according to an exemplary embodiment.

FIG. 7 is a schematic structural diagram of a server cluster according to an exemplary embodiment. A server cluster 700 includes at least one server. The server cluster 700 includes a central processing unit (CPU) 701, a system memory 704 including a random access memory (RAM) 702 and a read only memory (ROM) 703, and a system bus 705 connecting the system memory 704 and the CPU 701. The server cluster 700 further includes a basic input/output system (I/O system) 706 helping transmit information between components in a computer, and a mass storage device 707 configured to store an operating system 713, an application program 714, and another program module 715.

The basic input/output system 706 includes a display 708 configured to display information and an input device 709, such as a mouse and a keyboard, configured to input information for a user. The display 708 and the input device 709 are both connected to the CPU 701 by using an input and output controller 710 that is connected to the system bus 705. The basic input/output system 706 may further include the input and output controller 710 configured to receive and process an input from a plurality of other devices such as the keyboard, the mouse, or an electronic stylus. Similarly, the input and output controller 710 further provides an output to a display screen, a printer or another type of output device.

The mass storage device 707 is connected to the CPU 701 by using a mass storage controller (not shown) that is connected to the system bus 705. The mass storage device 707 and a computer-readable medium associated with the mass storage device 707 provide non-volatile storage for the server cluster 700. That is, the mass storage device 707 may include a computer-readable medium (not shown) such as a hard disk or a CD-ROM drive.

Generally, the computer-readable medium may include a computer storage medium and a communications medium. The computer storage medium includes volatile and non-volatile media, and removable and non-removable media implemented by using any method or technology for storing information such as a computer-readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. Certainly, persons skilled in the art may learn that the computer storage medium is not limited to the foregoing several types. The system memory 704 and the mass storage device 707 may be collectively referred to as a memory.

According to various embodiments of this application, the server cluster 700 may further be connected to a remote computer on a network through the network such as the Internet to run. That is, the server cluster 700 may be connected to a network 712 by using a network interface unit 711 that is connected on the system bus 705, or may be connected to a network of another type or a remote computer system (not shown) by using the network interface unit 711.

The memory further includes one or more programs. The one or more programs are stored in the memory. The CPU 701 executes the one or more programs to implement the sticker recommendation method shown in FIG. 2 or FIG. 4.

In an exemplary embodiment, a non-temporary computer-readable storage medium including an instruction, for example, a memory including an instruction, is further provided, and the instruction may be executed by a processor in a server to complete the sticker recommendation method in each embodiment of this application. For example, the non-transitory computer-readable storage medium may be a ROM, a RAM, a CD-ROM, a magnetic tape, a floppy disk, or an optical data storage device.

After considering this specification and practicing this application disclosed herein, persons skilled in the art would easily conceive of other implementation solutions of this application. This application is intended to cover any variation, use, or adaptive change of this application. These variations, uses, or adaptive changes follow the general principles of this application and include common general knowledge or common technical means in the art, which are not disclosed in this application. This specification and the embodiments are considered as merely exemplary, and the real scope and spirit of this application are pointed out in the following claims.

It should be understood that this application is not limited to the precise structures described above and shown in the accompanying drawings, and various modifications and changes can be made without departing from the scope of this application. The scope of this application is limited only by the appended claims.

What is claimed is:

1. A sticker recommendation method, as implemented by a server cluster, the method comprising:
   obtaining a use record of each group of stickers used by a user, the each group of stickers corresponding to at least one image style, and the each group of stickers comprising at least one picture;
   obtaining an image style of a specified sticker;
   determining an uncorrected recommendation index of the specified sticker;
   determining a priority of recommending the specified sticker to the user based on the uncorrected recommendation index;
   determining a corrected recommendation index of the specified sticker based on a preset correction formula comprising the uncorrected recommendation index, a frequency of using stickers of the each group of stickers by the user per unit of time period, a variance value of each element in an interest vector, and a cosine similarity of image styles between the specified sticker and the interest vector, wherein the interest vector is generated based on the use record and the at least one image style of the each group of stickers, and wherein the each element of the interest vector corresponds to a respective one of the at least one image style and indicates a quantity of times that one or more stickers, of the each group of stickers, that corresponds to the respective one of the at least one image style is used by the user; and
   recommending the specified sticker to the user when the corrected recommendation index satisfies a recommendation condition.

2. The method according to claim 1, further comprising:
   generating the interest vector by:
   initially setting the each element of the interest vector to a respective preset value;
   for the each element of the interest vector, adding the quantity of times to the respective preset value; and
   normalizing the interest vector obtained through addition.

3. The method according to claim 1, wherein the preset correction formula is:

$$rp(u, e) = cf(u, e) * \left(1 + \left(\frac{2}{1+\exp(-0.1*frq(u))} - 1\right) * \text{var}(v(u)) * sim(e, v(u))\right),$$

wherein rp(u, e) is the corrected recommendation index, cf(u, e) is the uncorrected recommendation index, frq(u) is an average quantity of times of using the stickers by the user per the unit of time period, v(u) is the interest vector, var(v(u)) is the variance value of the each element in the interest vector, and sim(e, v(u)) is the cosine similarity of image styles between the specified sticker and the interest vector.

4. The method according to claim 1, wherein determining the uncorrected recommendation index of the specified sticker comprises:
  determining the uncorrected recommendation index of the specified sticker according to a collaborative-filtering-based recommendation algorithm.

5. The method according to claim 1, wherein the recommendation condition comprises at least one of:
  the corrected recommendation index is greater than a preset index threshold; or
  a rank of the corrected recommendation index in recommendation indexes of to-be-recommended stickers is greater than a preset rank threshold.

6. The method according to claim 1, wherein before obtaining the use record of the each group of stickers used by the user, the method further comprises:
  obtaining sample stickers, wherein the sample stickers are some stickers whose image styles are labeled in a sticker library, and the sticker library comprises the each group of stickers used by the user and the specified sticker;
  extracting image feature information corresponding to each image style of the sample stickers;
  performing machine-learning training on the image feature information and the image style corresponding to the image feature information, to obtain a machine-learning classification model; and
  inputting image feature information of an unclassified sticker into the machine-learning classification model, to obtain an image style corresponding to the unclassified sticker, wherein the unclassified sticker is a sticker in the sticker library other than the sample stickers.

7. A sticker recommendation apparatus, comprising:
  a record obtaining module configured to obtain a use record of each group of stickers used by a user, the each group of stickers corresponding to at least one image style, and the each group of stickers comprising at least one picture;
  a recommendation index obtaining module configured to: obtain an image style of a specified sticker; and determine an uncorrected recommendation index of a specified sticker, the uncorrected recommendation index being used for indicating a priority of recommending the specified sticker to the user;
  a correction module configured to determine a corrected recommendation index of the specified sticker based on a preset correction formula comprising the uncorrected recommendation index, a frequency of using stickers of the each group of stickers by the user per unit of time period, a variance value of each element in an interest vector, and a cosine similarity of image styles between the specified sticker and the interest vector, wherein the interest vector is generated based on the use record and the at least one image style of the each group of stickers, and wherein the each element of the interest vector corresponds to a respective one of the at least one image style and indicates a quantity of times that one or more stickers, of the each group of stickers, that corresponds to the respective one of the at least one image style is used by the user; and
  a recommendation module configured to recommend the specified sticker to the user when the corrected recommendation index satisfies a recommendation condition.

8. The apparatus according to claim 7, further comprising:
  a vector generation unit comprising:
    a generation subunit configured to initially set the each element of the interest vector to a respective preset value;
    an addition subunit configured to: for the each element of the interest vector, add the quantity of times to the respective preset value; and
    a normalization subunit configured to: normalize the interest vector obtained through addition, and generate the interest vector of the user based on the normalized interest vector.

9. The apparatus according to claim 7, wherein the preset correction formula is:

$$rp(u, e) = cf(u, e) * \left(1 + \left(\frac{2}{1+\exp(-0.1*frq(u))} - 1\right) * \text{var}(v(u)) * sim(e, v(u))\right),$$

wherein rp(u, e) is the corrected recommendation index, cf(u, e) is the uncorrected recommendation index, frq(u) is an average quantity of times of using the stickers by the user per the unit of time period, v(u) is the interest vector, var(v(u)) is the variance value of the each element in the interest vector, and sim(e, v(u)) is the cosine similarity of image styles between the specified sticker and the interest vector.

10. The apparatus according to claim 7, wherein the recommendation index obtaining module is configured to determine the uncorrected recommendation index of the specified sticker according to a collaborative-filtering-based recommendation algorithm.

11. The apparatus according to claim 7, wherein the recommendation condition comprises at least one of:
  the corrected recommendation index is greater than a preset index threshold; and
  a rank of the corrected recommendation index in recommendation indexes of to-be-recommended stickers is greater than a preset rank threshold.

12. The apparatus according to claim 7, wherein the apparatus further comprises:
  a sample obtaining module configured to obtain, before the record obtaining module obtains the use record of the each group of stickers used by the user, sample stickers, wherein the sample stickers are some stickers whose corresponding image styles are specified in a sticker library, and the sticker library comprises the each group of stickers used by the user and the specified sticker;
  a feature extraction module configured to extract image feature information corresponding to each image style of the sample stickers;

a training module configured to perform machine-learning training on the image feature information and the image style corresponding to the image feature information, to obtain a machine-learning classification model; and an image style obtaining module configured to input image feature information of an unclassified sticker into the machine-learning classification model, to obtain an image style corresponding to the unclassified sticker, wherein the unclassified sticker is a sticker in the sticker library other than the sample stickers.

13. A non-transitory computer-readable medium including instructions that, when executed by a processor, causes the processor to:

obtain a use record of each group of stickers used by a user, the each group of stickers corresponding to at least one image style, and the each group of stickers comprising at least one picture;

obtain an image style of a specified sticker;

determine an uncorrected recommendation index of a specified sticker, the uncorrected recommendation index being used for indicating a priority of recommending the specified sticker to the user;

determine a corrected recommendation index of the specified sticker based on a preset correction formula comprising the uncorrected recommendation index, a frequency of using stickers of the each group of stickers by the user per unit of time period, a variance value of each element in an interest vector, and a cosine similarity of images styles between the specified sticker and the interest vector, wherein the interest vector is generated based on the use record and the at least one image style of the each group of stickers, and wherein the each element of the interest vector corresponds to a respective one of the at least one image style and indicates a quantity of times that one or more stickers, of the each group of stickers, that corresponds to the respective one of the at least one image style is used by the user; and recommend the specified sticker to the user when the corrected recommendation index satisfies a recommendation condition.

14. The non-transitory computer-readable medium according to claim 13, wherein the instructions, when executed by the processor, are further configured to:

generate the interest vector by:
   initially setting the each element of the interest vector to a respective preset value;
   for the each group of stickers, adding the quantity of times to the respective preset value;
   normalizing the vector obtained through addition.

15. The non-transitory computer-readable medium according to claim 13, wherein the preset correction formula is:

$$rp(u, e) = cf(u, e) * \left(1 + \left(\frac{2}{1 + \exp(-0.1 * frq(u))} - 1\right) * \text{var}(v(u)) * sim(e, v(u))\right),$$

wherein rp(u, e) is the corrected recommendation index, cf(u, e) is the uncorrected recommendation index, frq(u) is an average quantity of times of using the stickers by the user per the unit of time period, v(u) is the interest vector, var(v(u)) is the variance value of the each element in the interest vector, and sim(e, v(u)) is the cosine similarity of image styles between the specified sticker and the interest vector.

16. The non-transitory computer-readable medium according to claim 13, wherein the instructions, when executed by the processor, are further configured to: determine the uncorrected recommendation index of the specified sticker according to a collaborative-filtering-based recommendation algorithm.

17. The non-transitory computer-readable medium according to claim 13, wherein the recommendation condition comprises at least one of:

the corrected recommendation index is greater than a preset index threshold; or a rank of the corrected recommendation index in recommendation indexes of to-be-recommended stickers is greater than a preset rank threshold.

* * * * *